(12) United States Patent
Bridger et al.

(10) Patent No.: US 7,952,585 B2
(45) Date of Patent: *May 31, 2011

(54) INTERACTIVE ANIMATION

(75) Inventors: Nicholas Bridger, London (GB); Ed Bainbridge, London (GB); Jon Williams, Derby (GB); Matthew Humphries, Birmingham (GB); David Navarro, Derby (GB); Andy Brown, Sheffield (GB); David Pridmore, Derby (GB); Jon Maine, Derby (GB)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/916,825

(22) Filed: Nov. 1, 2010

(65) Prior Publication Data

US 2011/0043529 A1 Feb. 24, 2011

Related U.S. Application Data

(63) Continuation of application No. 11/746,293, filed on May 9, 2007, now Pat. No. 7,843,455.

(60) Provisional application No. 60/746,827, filed on May 9, 2006.

(51) Int. Cl.
*G06T 13/00* (2006.01)
(52) U.S. Cl. ........ 345/473; 345/161; 345/162; 345/474; 345/633; 463/7; 463/8; 463/36; 463/37; 463/38
(58) Field of Classification Search .................. None
See application file for complete search history.

(56) References Cited

U.S. PATENT DOCUMENTS

| RE28,507 | E | 8/1975 | Rusch |
|---|---|---|---|
| 4,026,555 | A | 5/1977 | Kirschner et al. |
| 4,799,635 | A | 1/1989 | Nakagawa |
| 6,196,917 | B1 | 3/2001 | Mathias et al. |
| 6,200,138 | B1 | 3/2001 | Ando et al. |
| 6,244,959 | B1 | 6/2001 | Miyamoto et al. |
| 6,275,213 | B1 | 8/2001 | Tremblay et al. |
| 6,280,327 | B1 | 8/2001 | Leifer et al. |
| 6,424,333 | B1 | 7/2002 | Tremblay et al. |
| 6,628,286 | B1 | 9/2003 | Comair et al. |
| 6,729,954 | B2 | 5/2004 | Atsumi et al. |
| 6,850,221 | B1 | 2/2005 | Tickle |
| 6,878,066 | B2 | 4/2005 | Leifer et al. |

(Continued)

OTHER PUBLICATIONS

Boon, Richard, "Cut Scenes—Friend or Foe?" CTW (computer Trade Weekly), issue 840, May 11, 2001. Posted via International Hobo, Feb. 15, 2007. http://blog.ihobo.com/2007/02/cut-scenes-frie.html.

*Primary Examiner* — Antonio A Caschera
(74) *Attorney, Agent, or Firm* — Marsh Fischmann & Breyfogle LLP; Kent A. Lembke

(57) ABSTRACT

An interactive animation environment. The interactive animation environment includes at least one user-controlled object, and the animation method for providing this environment includes determining a position of the user-controlled object, defining a plurality of regions about the position, detecting a user input to move the position of the user-controlled object, associating the detected user input to move the position of the user-controlled object with a region in the direction of movement, and providing an animation of the user-controlled object associated with the mapped region. A system and controller for implementing the method is also disclosed. A computer program and computer program product for implementing the invention is further disclosed.

20 Claims, 8 Drawing Sheets

U.S. PATENT DOCUMENTS

| | | |
|---|---|---|
| 6,987,515 B2 | 1/2006 | Liu |
| 7,843,455 B2 * | 11/2010 | Bridger et al. ................ 345/473 |
| 2002/0103031 A1 | 8/2002 | Neveu et al. |
| 2007/0078004 A1 | 4/2007 | Suzuki et al. |
| 2007/0091083 A1 | 4/2007 | Yamada et al. |

* cited by examiner

INTERACTIVE ANIMATION

CROSS-REFERENCE TO RELATED APPLICATIONS

This application is a continuation of U.S. patent application Ser. No. 11/746,293, filed May 9, 2007, issued as U.S. Pat. No. 7,843,455, entitled "Interactive Animation" which claims the benefit of U.S. Provisional Application No. 60/746,827 filed May 9, 2006, which are incorporated herein by reference in their entirety.

BACKGROUND TO THE INVENTION

1. Field of the Invention

The present invention relates to the improved presentation of interactive elements in user-controlled animation environments. The invention is particularly, but not exclusively, concerned with the presentation of interactive animation in video game environments.

2. Description of the Related Art

Video games are a typical and commonplace example of a user-controlled animation environment. A video game presents animation to a user as a composition of graphic elements. The graphic elements include backgrounds, characters, textures and objects that define an environment in which a game is played.

Computer generation and pre-rendering are two known common ways of generating the various graphic elements of a computer game.

Computer generation provides elements that are highly interactive and responsive to player inputs because of the graphic elements being rendered in real-time (or near-real-time). Computer generation, however, taxes computer resources and typically forces designers to compromise the quality of the presentation of the graphics in order to achieve reasonable responsiveness to user inputs.

Pre-rendering is typically used to provide backgrounds, movies and textures that are rendered by the game developer during production rather than while the game is being played. Pre-rendered elements can provide highly realistic and complex displays, but are not responsive to user inputs. Because of this lack of responsiveness, pre-rendered elements are useful primarily for elements that require a level of complexity that is too great for the target platform to render in real-time, and not used for elements such as characters that act out the game-play on-screen.

Many video games combine computer generated characters with pre-rendered graphic elements to implement interactivity within a game. However computer generation is not able to produce quality graphic elements on most gaming platforms, due to current processor limitations. This is particularly the case for complex interactions between characters as is common in any close-combat game and many sports games. As processor designs develop, however, these limitations will become less significant.

Even if a game platform is able to render a high-quality character, making complex, realistic movements; it is very difficult to provide a user with sufficient control over these complex movements with commercially accepted user input devices.

Moreover, it is difficult to detect interaction between graphical elements that are computer generated, for example, when swords clash in a sword play game.

It is an aim of the present invention to address one or more of the above-stated problems.

It is an aim of the present invention to provide an improved presentation of interactive elements in a user-controlled animation environment.

SUMMARY OF THE INVENTION

In accordance with the present invention there is provided a method, in an interactive animation environment including at least one user-controlled object, the method comprising: determining a position of the user-controlled object; defining a plurality of regions about said position; detecting a user input to move the position of the user-controlled object; associating the detected user input to move the position of the user-controlled object with a region in the direction of movement; and providing an animation of the user-controlled object associated with the mapped region.

The interactive animation environment may further include an active object with which the user-controlled object may interact in the region in the direction of movement, the step of providing animation comprising providing an animation of the user-controlled object and the active object.

A user-controlled character is an example of a user-controlled object. A non-user controlled character is an example of an active object. An active object may also be referred to as an active element. From the perspective of a user controlling a user-controlled object, an active element being a non-user-controlled object may be a character controlled by a different user. A user-controlled object may also be referred to as a player-controlled object, and a non-user-controlled object may be referred to as a non-player object.

The at least one non-user controlled object for interacting with the user-controlled object is preferably a non-user-controlled object. The non-user-controlled object is preferably controlled by an artificial intelligence agent.

The method preferably further comprises providing a control function for controlling the step of providing the animation of the user-controlled object with the associated region. The control function is preferably arranged to receive any user input for controlling the user-controlled object. The user input may relate to a movement or action of the user-controlled object. The control function is preferably arranged to receive input information identifying the behavior of any non-user controlled object. Where the non-user-controlled object is a non-user controlled character, the information may relate to a movement or action of the user-controlled character. The control function is preferably further arranged to control the step of providing the animation of the user-controlled character in dependence on the inputs.

The method further preferably provides an animation of the non-user controlled element with the associated region. The method preferably provides an animation of the interaction of the user-controlled character with the non-user controlled object. The interaction is preferably determined in dependence on a user input. The interaction may also be determined in dependence upon an action of the non-user controlled element.

The method further preferably provides an animation of the associated region.

Associating the detected user input to move the position of the user-controlled object with a region in that direction may comprise the step of mapping each possible user direction to a region, and determining the mapped region associated with the input user direction.

The at least one non-player object may be implemented as/controlled by an artificial intelligence (AI) agent. AI messages may be passed between the AI agents.

The method may include determining a non-user controlled object in a region corresponding to a user direction.

The method may include monitoring user inputs and AI messages (preferably in a choreography layer).

The method may include coordinating AI messages (preferably in a choreography layer).

The method may include determining AI character actions based on the AI messages.

The method may include storing a set of predetermined animations for each object, element, or character.

The method may include selecting suitable animations in dependence on: the AI object actions in order to display an interaction between the user-controlled object and an AI-controlled object.

There may be provided a plurality of non-player objects.

Preferable embodiments of the invention include some or all of the following features.

Each region may be mapped to a direction of a directional control on a user input device. The number of regions may be four. Each region may be mapped to one of the directions: up; down, left; right. The mapping of regions to directions is not limited by height or depth.

The user-controlled object may interact with a non-user controlled object through combat. The combat is preferably a sword fight.

The animations may be pre-rendered. The animations may be real-time rendered.

The selected animation may be dependent upon the relative heights of the user-controlled object and the non-user-controlled object.

The selected animation may be dependent upon the state of the object. State may include, for example, weapon sheathed or unsheathed.

The position of the non-user controlled object may be adjusted prior to rendering of the animation. The position may be adjusted by turning the non-user controlled object. The position may be adjusted by moving the non-user controlled object. The adjustment may be within the active region. The adjustment may be to ensure that the position of the user-controlled object and non-user-controlled object is matched up in readiness for the rendered animation.

The user-controlled object may engage a plurality of active objects in a region. The engagement with a plurality of active objects is preferably coordinated. The engagement of a plurality of active objects involves engaging all active objects with a single user input.

In an embodiment the invention involves a realistic choreographed system using a combination of animation, interactive objects and user input governed by an underlying system of rules in a 3D environment.

In an embodiment the invention involves a system that implements a combat system that displays realistic character movement and interactions including very precise contact between weapons such as swords. Creating such a system based purely on player input and blends between animations is impractical, and this problem is overcome by providing an intelligent system that choreographs the moves while retaining input from the player.

By defining which moves play together and linking them up through scripted animations sets, the present invention provides realistic combat while retaining the player's involvement. A bank of animations is predefined, for various characters and other graphical elements that will be presented as high-quality user-responsive graphical elements in the game. Each animation provides an image, or more typically a series of images, that correspond to a very specific action in the game. In particular examples each animation corresponds to a particular character (e.g. a player character, a particular enemy character etc.) and a particular characteristic of the character or game context that indicate when the animation is appropriate for use in the game.

Rather than rendering a complex graphic in real-time, the system of the present invention selects a context appropriate animation or set of animations based on the character's situation, user input(s), and/or characteristics chosen by the game designer. The set of animations is played resulting in cinema quality presentation to the players. The set of animations is based on key frames. The number of characteristics that may be associated for a given animation is virtually limitless. Also, the number of animations that can be stored in the bank of animations can be very large so as to provide variety, realism, and context-appropriate animation in a wide variety of situations presented by the game.

BRIEF DESCRIPTION OF THE DRAWINGS

The invention will now be described by way of example with reference to the accompanying Figures, in which.

DESCRIPTION OF PREFERRED EMBODIMENTS

Figure 1A:
FIGS. 1(a) to 1(f) illustrate the concept of defining regions around a user-controlled character position in accordance with a preferred embodiment of the invention.

The invention is described herein by way of reference to particular examples and preferred embodiments. The invention is not limited to any aspects of such examples and preferred embodiments. The examples and preferred embodiments are presented for the purpose of illustrating the concepts of the invention and ease of understanding of the invention, and do not limit the scope of the invention.

In the following description the invention is described in the context of a video game, the video game being an example implementation of an interactive animation environment. Such a video game may comprise software running under the control of a processor of a dedicated computer game hardware console. In a particular example there is described a close-combat computer game, where a user of a user input device, such as a handheld controller attached to a game console, controls an object or element, such as a character, within the game. The user-controlled character may interact with other objects or elements within the game, such as non-user controlled characters. The user-controlled character may engage in close combat with one or more non-user controlled characters at different stages of the game. In one particular described example, the close combat involves a sword fight between the user-controlled character and one or more non-user controlled characters.

A user-controlled character is an example of a user-controlled object. A non-user controlled character is an example of an active object. An active object may also be referred to as an active element. Herein, the term active element or active objects is used to refer to an object or element over which the user or player does not have direct control. From the perspective of a user controlling a user-controlled object, an active element being a non-user-controlled object may be a character controlled by a different user. A user-controlled object may also be referred to as a player-controlled object, and a non-user-controlled object may be referred to as a non-player object.

In the following description a user is understood to refer to a player of a computer game. A user-controlled character may alternatively be referred to as a player-controlled character. A non-user-controlled character may alternatively be referred to as a non-player-controlled character.

The general architecture of the hardware for implementing a computer game console will be known to one skilled in the art, as will the general concept of computer game operation and interaction between user-controlled characters and other characters within a computer game in use. In the following description only those elements of a computer game, and the structure of its associated software and hardware, are referred to or described in sufficient detail for one skilled in the art to understand and implement the invention.

A preferred embodiment of the invention will now first be described with reference to FIGS. 1(a) to 1(f) and FIG. 2. FIGS. 1(a) to 1(f) illustrate the principles of a preferred embodiment of the invention, and FIG. 2 illustrates a process flow for implementing such principles.

Referring to FIG. 1(a), there is shown a solid circle denoted by reference numeral 188. The solid circle 188 represents a current position of a user-controlled character in an exemplary computer game. The current position of the user-controlled character may be denoted within the computer game software by any appropriate coordinate system, and the position identification technique used is outside the scope of the present invention.

Figure 2:
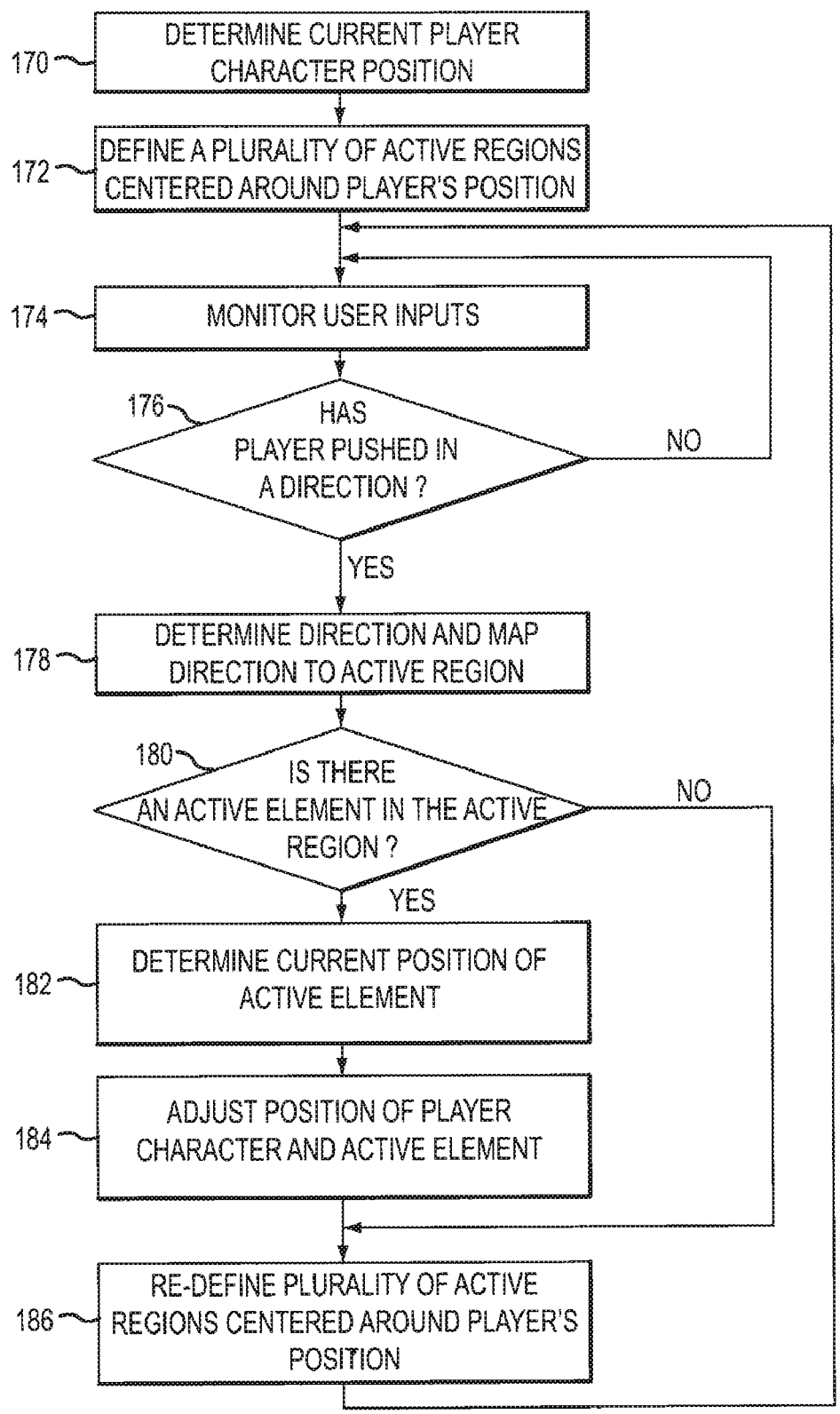
FIG. 2 illustrates a process for implementing the concept of FIGS. 1(a) to 1(f)

Referring to FIG. 2, in a preferred embodiment of the invention in a step 170 a control function associated with the computer game determines the current position or location of the user-controlled character in the context of the game's coordinate system. This location defines the position of the user-controlled character in a particular scene of the game.

In accordance with the preferred embodiment of the invention, in a step 172 of FIG. 2 the control function then defines a plurality of regions, which may be referred to as active regions, centered on the player's position. The number of regions will be implementation dependent. In the described preferred embodiment there is defined four regions. The 360° area is thus preferably split into four 90° quadrants as illustrated in FIG. 1(b).

In accordance with the preferred embodiment the two-dimensional area around the user-controlled character is split into regions. This two-dimensional area may represent, for example, a ground area or floor along which the user-controlled character may be moved (by user control). In alternative implementations, however, a three-dimensional area may be split or defined into regions in accordance with the inventive concepts as described herein.

Figure 1B:
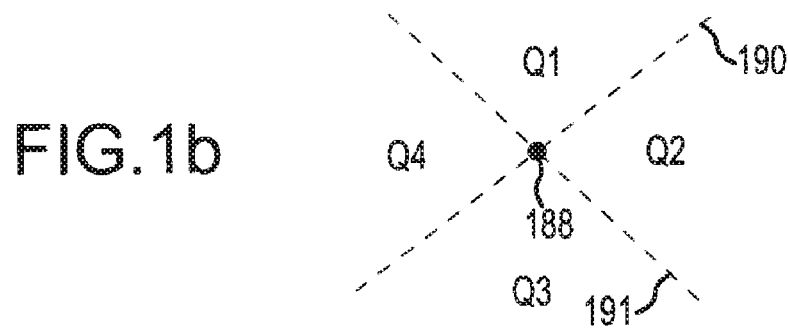
Figure 1C:
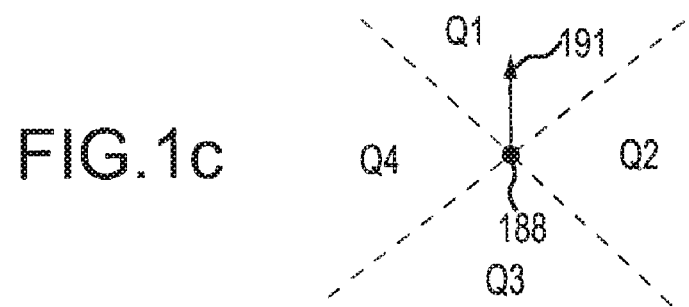

Referring to FIG. 1(b) the definition of the four regions in the described embodiment can be seen. A first diagonal dashed line 191 passing through the position 188 at which the user-controlled character is located, travels from a point above and to the left of the position to a point below and to the right. A second diagonal dashed line 190 passing through the position 188 at which the user-controlled character is located, travels from a point below and to the left of the position to a point above and to the right. Looking at the position 188 at which the user-controlled character is located, and using an angular location system, it can be understood that in the preferred example where there is defined four regions, the regions are defined such that: a first quadrant Q1 is defined as being, relative to the position 188 of the user-controlled character, from +45° to +135°; a second quadrant Q2 is defined as being, relative to the position 188 of the user-controlled character, from +45° to −45°; a third quadrant Q3 is defined as being, relative to the position 188 of the user-controlled character, from −45° to −135°; and a fourth quadrant Q4 is defined as being, relative to the position 188 of the user-controlled character, from −135° to −225°.

In the two-dimensional example described, FIG. 1(b) can be understood as illustrating a view of the position 188 of a user-controlled character from above, with the 360° area around the position being the area within the character may move. This does not represent the graphical image or animation displayed to the user, which will be a three-dimensional rendering of a scene within which the character is located.

The radial length of each quadrant is not defined. The purpose of defining the regions around the current location of the user-controlled character is to be able to determine', in the event of detection of a user input to move or push the user-controlled character in any direction, the direction as being into one of the defined regions. To this purpose, as part of the step 172 of FIG. 2 defining the regions around the current position of the user-controlled character, there is also included a step of mapping or associating each possible user input indicative of direction to a defined region. In the described preferred example, the directions are mapped/associated such that: a user input to indicate movement to the right is mapped to the region identified as Q2; a user input to indicate movement to the left is mapped to the region identified as Q4; a user input to indicate movement ahead or forward is mapped to the region identified as Q1; a user input to indicate reverse or backward movement is mapped to the region identified as Q3. The more regions that are defined, the more complex the mapping will be between the user input and the defined regions.

Once the regions are defined, and the user input movement is mapped to/associated with the defined regions, in a step 174 of FIG. 2 the control function monitors the inputs received from the user input device. Specifically, the control function monitors for user inputs indicative of the user controlling the movement of the user-controlled character.

In a step 176, the control function determines whether a user input has been received which indicates that the user-controlled character is being pushed or moved in a certain direction by the user. If no such user input is received. Then the user inputs continue to be monitored in step 176.

If in the step 176 a user input representative of a user-controlled character being pushed in a direction is received, then in a step 178 it is determined the direction, and the direction is mapped to a defined region. By way of example, referring to FIG. 1(c), there is shown an arrow 192 indicating that the user-controlled character is being pushed in a forward direction. This movement is mapped, in step 178, to quadrant Q1. In practice each possible direction that may be received from the user input device is mapped to one of the four directions.

In a step 180 there is then determined whether there is an active element in the defined region toward which the user-controlled character is being pushed. An active element may be any element with which a user-controlled character may interact. An active element may be, for example, an item that a character may pick up or control. For example a user-controlled character may pick-up a weapon, or control the opening of a door. An active element may be a user-controlled character controlled by a different user. An active element may be a non-user controlled character, such as an enemy with which the user-controlled character may engage in combat.

Figure 1D:
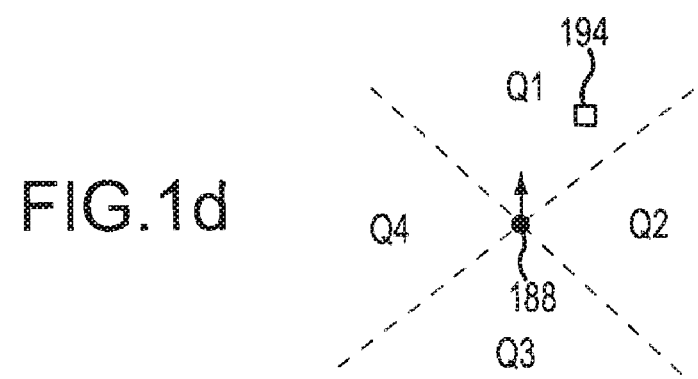

In the described preferred example, and referring to FIG. 1(d), in step 180 it is determined that there is one active element 194 in the region Q1. In the preferred embodiment the active element 194 is a non-user-controlled character, and specifically a character with which the user-controlled character may engage in a sword-fight.

Thus in step 180 it is determined whether there is any active element anywhere within the quadrant Q1. The position of any such active element may be anywhere in that quadrant. As discussed further below, there may be more than one active element in the quadrant.

In a step 182 the current position of the active element 194 is determined. The purpose of the invention is to provide a user; controlling a user-controlled character, with an improved quality of animation when engaging with an active element such as the non-user controlled character 194, and particularly in the described embodiment to provide cinema quality animation when engaged in a sword-fight. In order to achieve this, the user-controlled character is preferably aligned with the non-user-controlled character, after the user-controlled character 'moves' into the region Q1, such that the positioning of the two is consistent with the initial scene of a subsequent animation sequence.

The splitting of the 360° area around the user-controlled character into the four quadrants allows for an efficient handling of interaction with an active element such as a non-user-controlled character. The interaction may include a user-controlled character attacking a non-user controlled character, for example, or a user-controlled character responding to an action of the non-user-controlled character, e.g. a defensive action. The specific position of the non-user-controlled character is not important to the user/player, which will merely be attacking in their general direction using the preferred four-direction system. In summary, the combat system of the preferred embodiment constantly asks three questions:

The user/player has pushed the user-controlled character in a direction, which quadrant is in this direction?
Is there someone (or something), e.g. a non-user-controlled character, in this quadrant?
What is the specific position on screen of this non-user controlled character?

Once the answers to these questions are known, the control function has sufficient information to line up the user-controlled and non-user-controlled animation so that a sword-fight may take place.

In a step 184 the position of the non-user-controlled character 194 is adjusted, if necessary, in dependence on the position identified in step 182, to ensure correct alignment. This adjustment step is optional, in dependence on the actual relative positions of the characters.

Figure 1E:
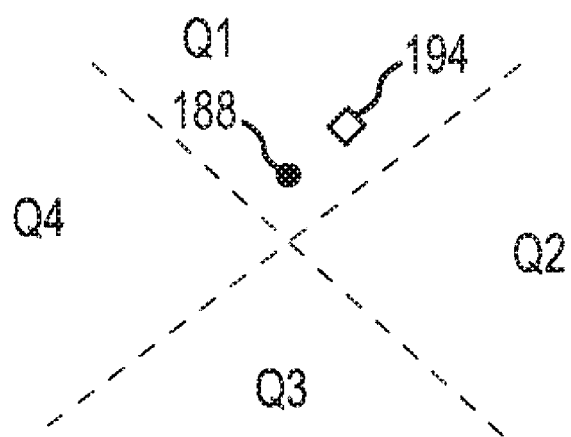
Figure 1F:
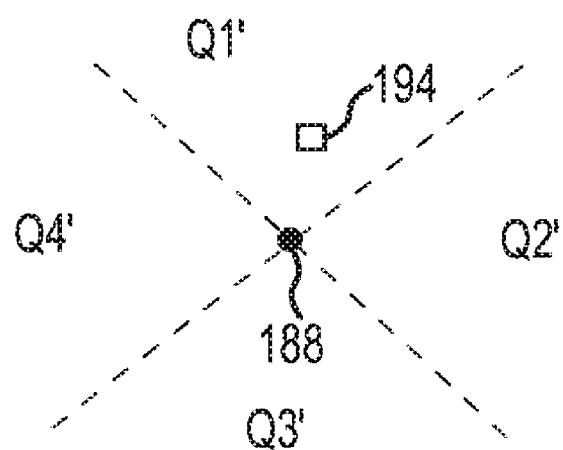

Preferably the position of the user-controlled character is not adjusted. However, the position of the user-controlled character may be adjusted by the user. If so, the distance between the user-controlled character, and the non-user controlled character remains constant after any adjustment. In the event that the position of the user-controlled character does need to be adjusted, as illustrated in FIG. 1(e), the definition of the regions around the position are realigned such that adjusted quadrants Q1', Q2', Q3' and Q4' are defined as shown in FIG. 1(f). This redefinition of the active regions in FIGS. 1(e) and 1(f) is denoted by step 186 in FIG. 2.

Lining up the characters for a sword-fight thus may involve turning the characters slightly so they are facing each other. The movement of the user-controlled character is controlled solely by user inputs. The movement of the non-user controlled character is controlled by a control system under control of which the game operates.

The user is free to push a joystick of the user input device in multiple directions, and the system is able to handle the requests and turn the user-controlled character to meet a next attack or initiate a next attack.

Following the adjustment of the position of the non-user-controlled character, and if necessary the user-controlled character, as illustrated in FIG. 1(f) the respective characters are positioned ready for the subsequent animation. As a result of the user input to move the user-controlled character in the direction 192, an animation associated with the relative positioning illustrated in FIG. 1(f) is presented. This animation is the first presented animation of a potential sequence of animations depending on the user inputs, and actions of the non-user-controlled character, immediately following. The subsequent animation is based on the relative starting positions of the characters as illustrated in FIG. 1(f).

The subsequent animation is displayed, in the preferred embodiments, by retrieving pre-rendered animation from memory. Preferably a set of possible animation sequences are stored in memory. In an alternative the animation may be streamed from other sources. These sequences are animation sequences for the user-controlled character, animation sequences for one or more non-user controlled character, and animation associated with other game contexts (such as backgrounds etc.). By splitting the areas around the user-controlled character into regions, the number of potential animation sequences is limited. By pre-positioning the user-controlled character with any active element with which it may interface in such region, the starting point for each animation sequence is aligned.

The pre-rendered animation sequences allow for all possibilities of user input. Thus, for example, all possible animation sequences for each type of attack that a user-controlled character may launch are stored. Appropriate animation sequences for a non-user-controlled character in response to such attack are also stored. All possible animation sequences for each type of attack that a non-user-controlled character may launch are also stored. Appropriate animation sequences for a user-controlled character in response to such attack are also stored, together with animations associated with defensive actions that the user may take.

In dependence on the gameplay, as will be discussed further herein below, the control function controls access to the pre-rendered animation to display interactive animation.

Although in the preferred embodiments the animation is pre-rendered, where processing capabilities permit the animation may be computer generated: The game play includes user inputs, and non-user-controlled character actions.

The control function used by the preferred embodiments of the present invention, for controlling the process flow as described above and other process flows as described hereinafter, provides a coordination functionality. This coordination functionality may also be termed a choreography functionality. This functionality can be further understood with reference to FIG. 3, which illustrates some of the control layers in a computer game adapted in accordance with preferred embodiments of the invention.

Figure 3:
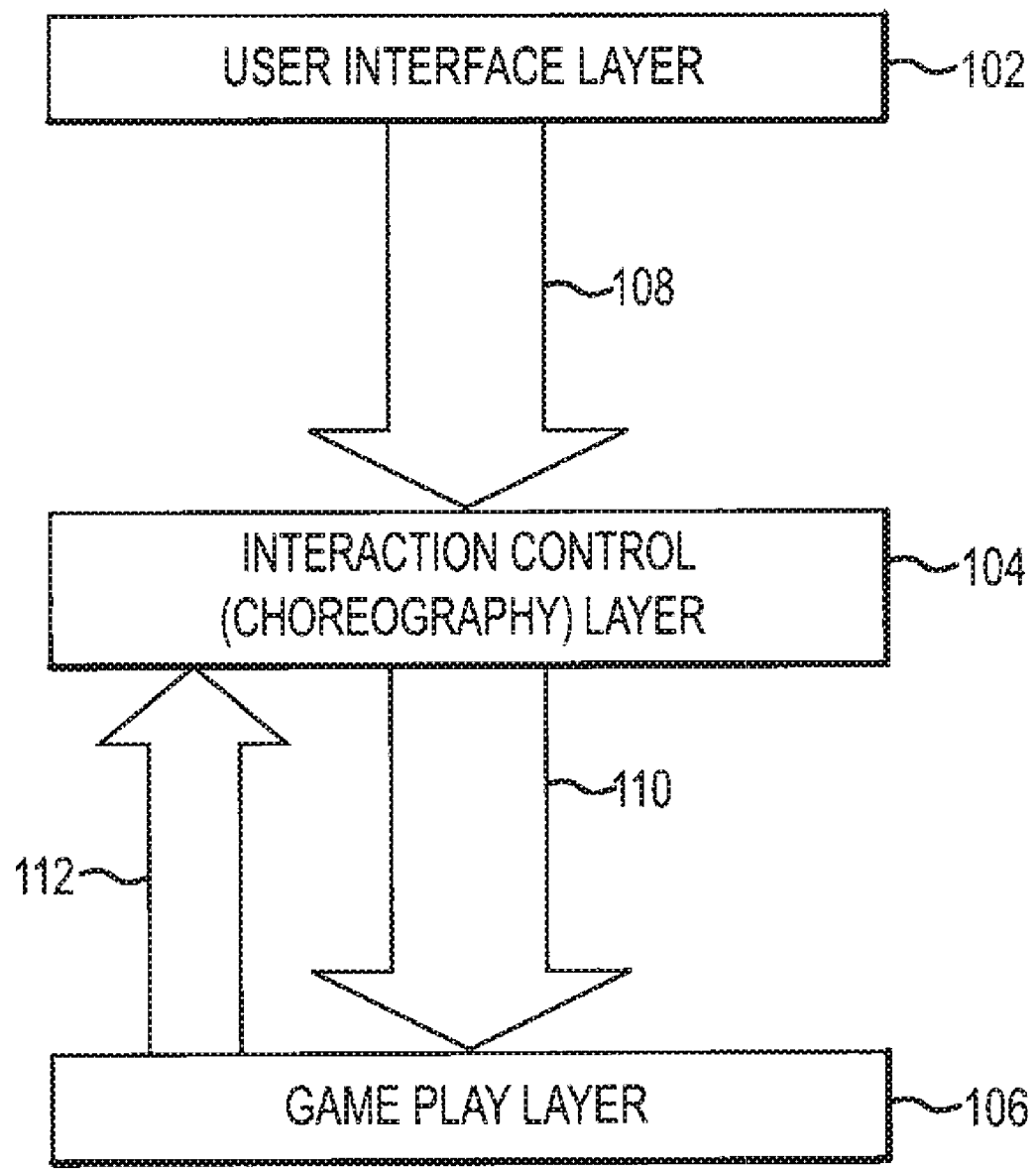
FIG. 3 illustrates control layers in accordance with an embodiment of the invention.

As illustrated in FIG. 3, there is provided a user interface layer 102 above an interaction control, or choreography, layer 104. The user interface layer provides inputs to the interaction control layer 104 as denoted by arrow 108. The interaction control layer controls a game play layer 106, as denoted by arrow 110. In addition the game play layer provides inputs to the interaction control layer as denoted by arrow 112. The interaction control layer may be part of a larger control layer associated with overall control of the game. For the purposes of the present description, discussion is confined to its functionality in coordinating or choreographing game play as discussed hereinafter, and it may therefore be referred to as a coordination layer or a choreography layer. The gameplay sits on top of the choreography layer.

The choreography layer, or the coordination/choreographic functionality of the control function, is a construct devised to oversee the positioning and attack patterns of enemies (non-user controlled characters) around the user-controlled character. The main issue is to provide a system which is both responsive and cinematic—it has to resemble a choreographed fight from a movie, with a large amount of sword contact with multiple enemies surrounding the user-controlled character, and few but decisive successful hits.

However at the same time it must not feel 'sticky' or slow and it must leave the user with the impression of being in full control at all times.

In a preferred embodiment non-user-controlled characters are implemented by artificial intelligence (AI) agents. The choreography layer or function coordinates message passing between the AI agents, to determine which of the surrounding enemies are actively attacking the user-controlled character and when, both to avoid attacks coming in too quickly, and to establish a rhythm to the action that the player can easily slip into.

The choreography layer is aware of actions of the user-controlled character resulting from user inputs, as is denoted by inputs 108 in FIG. 3. The choreography layer is also aware of non-user controlled character actions, as denoted by arrow 112, by monitoring the AI message passing between AI agents.

The choreography layer selects context appropriate animations for the user-controlled character and/or the non-user controlled character based on this monitoring as well as other context characteristics provided by the game. For example the choreography layer keeps track of when the user-controlled character attempts to block an incoming attack, and will determine which animation is played, and indeed from which enemy the attack is coming from and at what height. This provides the cinematic quality of the constant sword contact.

The choreography layer handles multiple enemies directly engaging a user-controlled character, plus a number of enemies standing further out, occasionally trading places with ones in the active combat area.

By implementing this choreography layer the present invention solves the problem of producing a realistic and intelligent sword fight while retaining the user's involvement in the combat.

The system of the present invention contemplates expansion by enabling the ability to add a range of new behavior from the non-user-controlled characters to enhance the combat system as well as cater for different forms of close combat weaponry.

Figure 4:
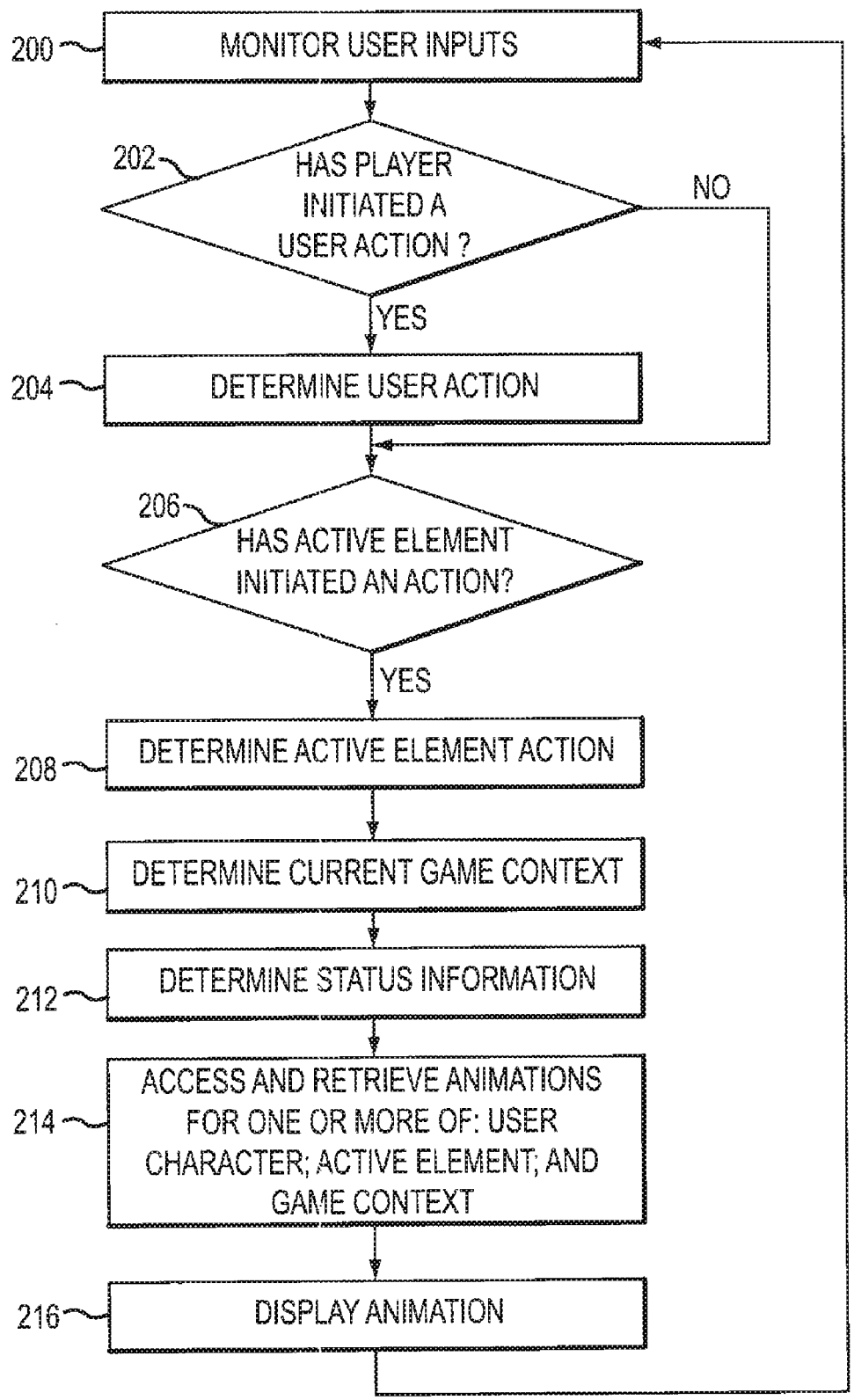
FIG. 4 illustrates a flow process for displaying animation in accordance with an embodiment of the invention.

Referring to FIG. 4 there is illustrated a process flow, controlled by the control function, for the overall gameplay including the coordinating/choreography once the user-controlled character has 'engaged' a non-user controlled character in accordance with the techniques described hereinabove with reference to FIGS. 1 and 2.

In a step 200 the control function monitors for user inputs. More specifically, the control function monitors for user input associated with an action of the user-controlled character, such as an attack action or a defensive action.

In a step 202 it is determined whether a player has initiated a user action. If no user action is detected then the process moves forward to step 206.

If a user action is detected, then in a step 204 there is determined the specific action that has been detected.

Thereafter in step 206 it is determined whether a non-user-controlled character, or more generally an active element with which the user-controlled character may engage, has initiated an action. Such an action may be to launch an attack on a user-controlled character.

If no non-user-controlled act is detected, then the process moves to step 210. If a non-user controlled character has initiated an action, in step 208 it is determined what that action is.

Thereafter in step 210 there is determined a current game context.

Thereafter in a step 212 there is determined a status information of any element. The status element may be the current status of the user-controlled character, e.g. sword drawn, sword sheathed, low strength, etc., or status information of any other active element.

In a step 214 an appropriate animation sequence, or sequences, is retrieved from the pre-rendered images. This may involve retrieving an animation associated with the user-controlled character, an animation associated with the non-user controlled character, and a context animation, and forming a composite animation for display. A sequence of animation may be displayed. The displayed animation will depend on the current states and the current inputs, all processed by the control function.

The display of the animation is denoted by step 216. Thereafter the process returns to step 200 for displaying the next animation or animation sequence in dependence upon the next set of inputs.

The skill of play is introduced by the timing of the control of the user-controlled character. The user pushes the joystick, for example, in a given direction and presses any of a set of context sensitive attack buttons provided on the game console handset. Successful gameplay involves pressing the buttons at the right time to meet the attack of an oncoming non-user controlled character or to take advantage of a weak moment.

By varying the timing of the attacks from the non-user-controlled characters, under the control of the control (choreograph) function, the system allows for the implementation of a dynamically difficult system. By way of a specific example, a first animation is selected to present the user-controlled character's sword attack. A second animation is selected to present a corresponding defensive maneuver of the non-user-controlled character where the defensive maneuver is specific to the attack as well as the other context characteristics defined by the game designer. Although the first and second animations are designed to result in a connection between the swords, the connection only occurs when the two characters are precisely situated in the combat area with respect to each other. Hence the animations are selected based on the character's position and/or the character's position is controlled such that they are in a position corresponding to the selected animations at the time the animations are displayed on the screen.

Making swords connect convincingly during swordplay thus requires positional control over both the user-controlled character and the non-user-controlled character, i.e. to ensure that the characters can be aligned to be consistent with the predefined images associated with the pre-rendered images connected with the interactive swordplay.

Figure 5:
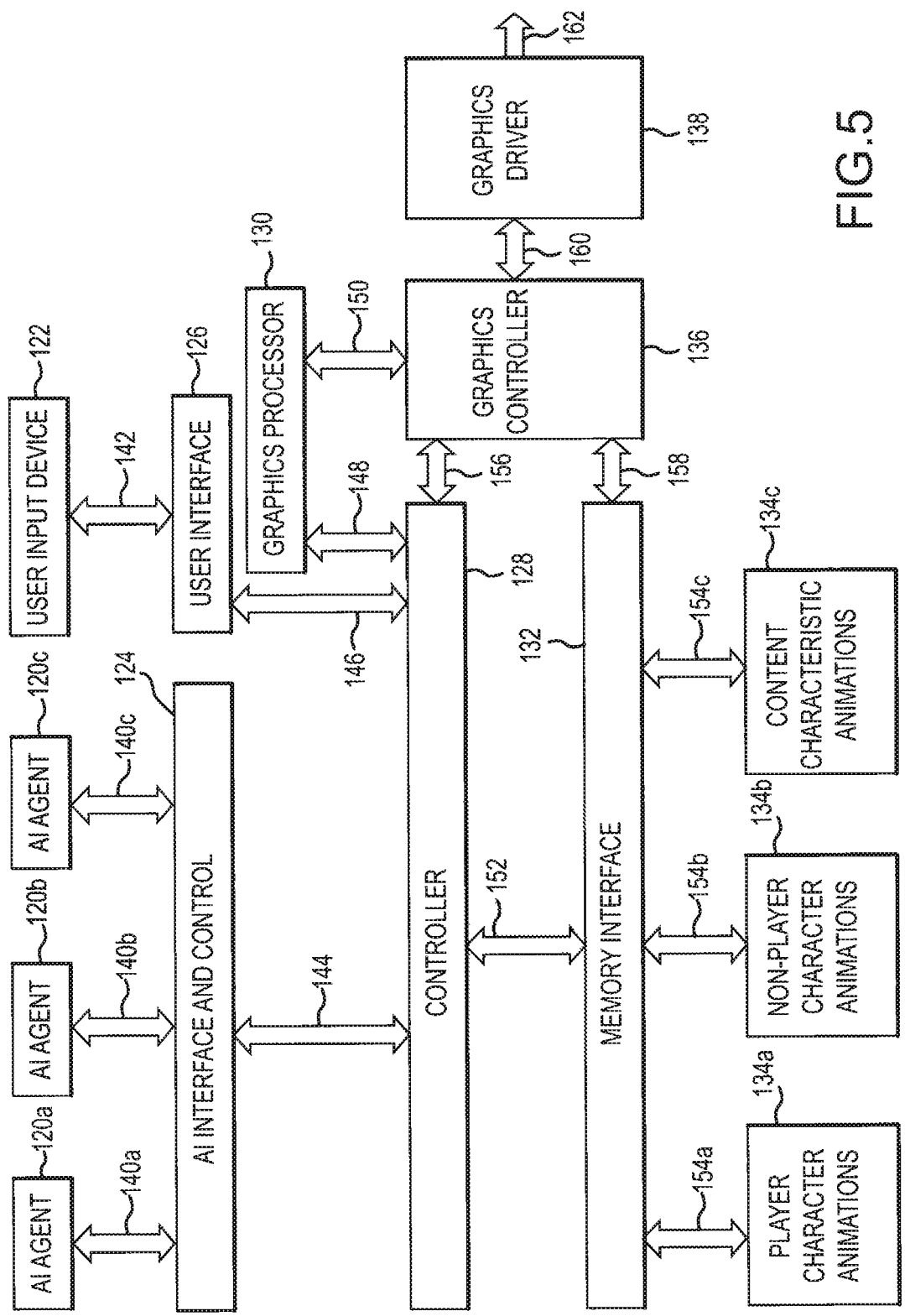
FIG. 5 illustrates a system architecture for providing functionality in accordance with an embodiment of the invention.
Figure 6A:
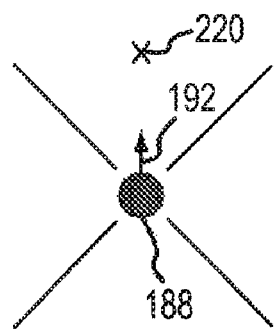
FIG. 6 illustrates example scenarios to be handled by the control function in embodiments of the invention.
Figure 6B:
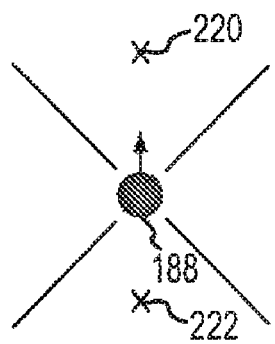
Figure 6C:
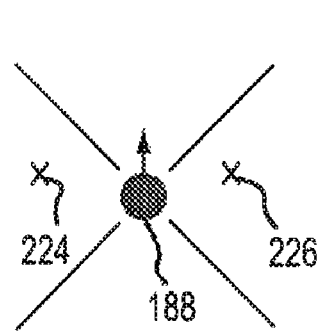
Figure 6D:
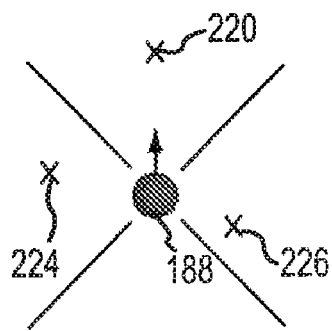
Figure 6E:
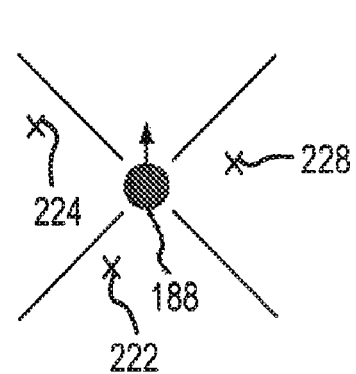
Figure 6F:
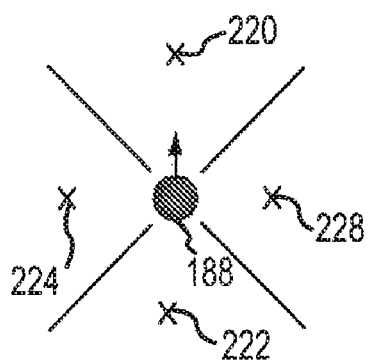

The main functional elements for implementing preferred embodiments of the present invention are shown in FIG. 5. The invention may be implemented in conventional processor based hardware, and adapted to provide the necessary functionality to implement preferred embodiments of the invention.

The control functionality is provided by a controller 128, which may be part of a system controller for the overall gameplay, including a system processor. The controller implements the coordination or choreographic functionality required to implement preferred embodiments of the invention.

There is illustrated three distinct storage devices 134a, 134b, and 134c, which in practice may form part of a single large storage area. For the purpose of illustration, the storage device 134a stores the pre-rendered animations associated with the user-controlled character. The storage device 134b stores the pre-rendered animations associated with the non-user-controlled character(s). Multiple such storage devices may be provided for each different type of non-user-controlled character. The storage device 134c stores the pre-rendered animations associated with the game contexts.

There is provided a memory interface 132 for providing an interface on interface connections 154a, 154b 154c to the respective memory storage devices 134a, 134b, 134c. The memory interface is further connected to the controller 128 via interface connection 152, and to a graphics controller 136 via interface connections 158.

There are illustrated three distinct artificial intelligence (AI) agents 120a, 120b, and 120c. Each is associated with a respective non-user-controlled character. The implementation of such AI agents is known to one skilled in the art.

There is provided an AI interface 124 for providing an interface on interface connections 140a, 140b, 140c to the respective AI agents 120a, 120b, 120c. The AI interface is further connected to the controller 128 via interface connection 144. The AI interface 124 also provides certain control functionality for the AI agents.

There is illustrated a user input device 122. There is provided a user interface 126 for providing an interface on interface connection 142 to the user input device 122. The user interface 126 is further connected to the controller 128 via interface connection 146.

The graphics controller 136 is further provided with an interface connection 156 to the controller 128. A graphics processor 130 is connected to the controller 128 via an interface connection 148 and to the graphics controller via interface connection 150. The graphics controller 136 is connected to a graphics driver 138 via interface connection 160, and the graphics driver 138 is connected to drive the animation display (not shown) via interface connection 162.

The invention is now further described with reference to exemplary operations of game play.

In a preferred implementation a plurality of non-user-controlled characters may engage the user-controlled character at any one time. For example, four non-user-controlled characters may attack the user-controlled character. Examples of possible attack patterns are illustrated in FIG. 6, showing the attack patterns a user-controlled character may face and that the control function may thus have to deal with.

Each of the scenarios in FIG. 6 illustrates the user-controlled character 188 pushing or moving toward the upper quadrant as illustrated by arrow 192. In each scenario the user-controlled character is under attack from one or more non-user controlled characters. In FIG. 6(a) a sole attack is provided by active element 220 in the upper quadrant. In FIG. 6(b) a two-prong combined attack is provided by active element 220 in the upper quadrant and active element 222 in the lower quadrant. In FIG. 6(c) a two-prong combined attack is provided by active element 224 in the left quadrant and active element 226 in the right quadrant. In FIG. 6(d) a three-prong combined attack is provided by active element 220 in the upper quadrant, active element 224 in the left quadrant, and active element 226 in the right quadrant. In FIG. 6(e) a three-prong combined attack is provided by active element 224 in the left quadrant, active element 222 in the lower quadrant, and active element 228 in the right quadrant. In FIG. 6(f) a three-prong combined attack is provided by active element 224 in the left quadrant, active element 222 in the lower quadrant, active element 220 in the upper quadrant, and active element 228 in the right quadrant.

The non-user-controlled characters are not in a set position within each quadrant, and can be positioned anywhere within them and cross over into other quadrants as required. This prevents the problem of 'enemies' continually looking symmetrical in their stand patterns on the screen around the user-controlled character. Thus with a non-user-controlled character positioned in a quadrant, the user-controlled character faces it with a pre-arranged relationship. In order to vary the appearance of these characters, they move into different quadrants.

The end result of the system of the preferred embodiments is a choreographed close control combat game, such as a sword fight, which looks very realistic but puts the player in control of the action at all times.

Simultaneous attacks are a special form of attack occurring when multiple opponents attack at the same time from the same direction, i.e. within the same defined region. For example three enemies very close together may charge at the user-controlled character with their swords. The pre-rendered animation effectively treats such simultaneous attack as a single attack, pushing in their direction to engage them, and pressing the attack button at the appropriate time to attack them simultaneously. The desired on-screen effect, as a result of the displayed animation, is the user-controlled character parrying all three attackers.

This concept can be used, for example, for two, three or four non-user controlled characters attacking simultaneously. As long as the animations remain available, in a preferred embodiment simultaneous attacks allow the following:

Three-strong non-user controlled character attack
Two-strong non-user controlled character attack
Three-strong non-user controlled character swordplay
Two-strong non-user controlled character swordplay As necessary, a non-user-controlled character may move into another non-user controlled character's quadrant to attack the user-controlled character if they find they are blocked by an object or cannot actively reach the player at that moment, e.g. if they are in a corridor and there is less room. Such movement is controlled by the artificial intelligence agent in accordance with known techniques.

In addition to such simultaneous attacks, the group behavior of the non-user-controlled characters may be controlled by the control function or the choreographic function. The system is setup to show the characters fighting the user-controlled character as a group. Non-user-controlled characters may surround the user-controlled character, and coordinate attacks, giving the user the feeling they are facing an organized group of attackers. In this respect, the non-user-controlled characters are not truly autonomous. Messaging between the AI agents implementing the non-user-controlled characters allows the behavior of one non-user controlled character to be altered based on the behavior of another. This allows a non-user-controlled character to withhold an attack or to select a different style of attack while another non-user-controlled character is engaging an attack.

The user-controlled character may also 'step-out' to attack a non-user-controlled character. The mechanism for detecting such attacks is described hereinabove with reference to FIG. 1. In a period where a non-user-controlled character is not 'jumping in' to attack, the user can decide to take the fight to that character. By pushing in the direction of the quadrant that contains the non-user-controlled character and pressing the appropriate attack button on the user interface, the user may initiate a 'step out' followed by attacking the character, e.g. hitting the character or entering swordplay.

The user-controlled character 'stepping out' can be used as both an offensive maneuver and a defensive maneuver. If timed correctly, the player may step out of the way of an incoming attack. Stepping out of the way of an incoming attack may initiate an attack with another enemy character. If timed incorrectly, it may end with the user-controlled character being hit as the user attempts to control a 'step out'.

The flow of the interaction between the user-controlled character and the one or more non-user-controlled characters, i.e. the melee combat, requires a level of control in order for the user to be able to cope with what could be several attacks coming in a short period of time. Even though the interaction looks realistic on screen, the actual underlying system is choreographing the interaction. The choreographing of the interaction relies upon timing as the key.

Figure 7A:
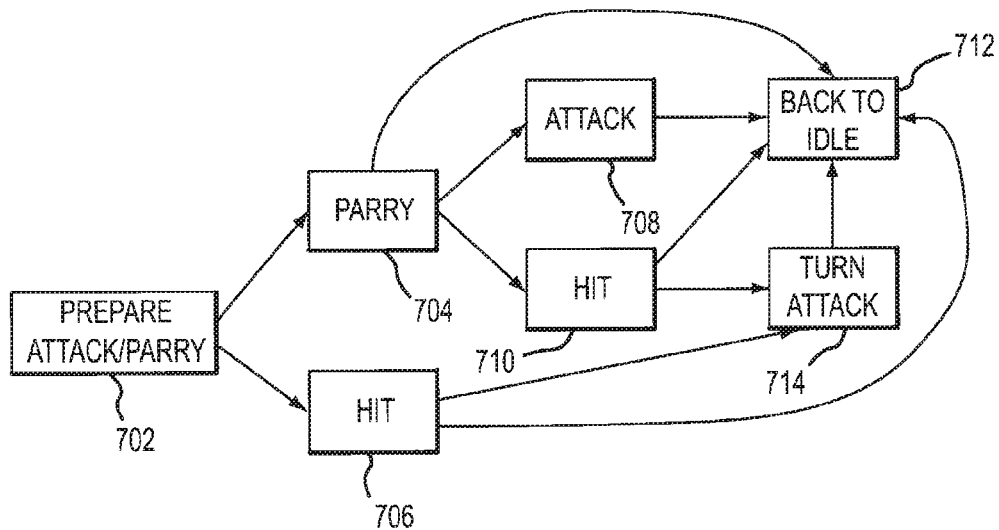
FIG. 7 illustrates flow processes in accordance with embodiments of the invention.
Figure 7B:
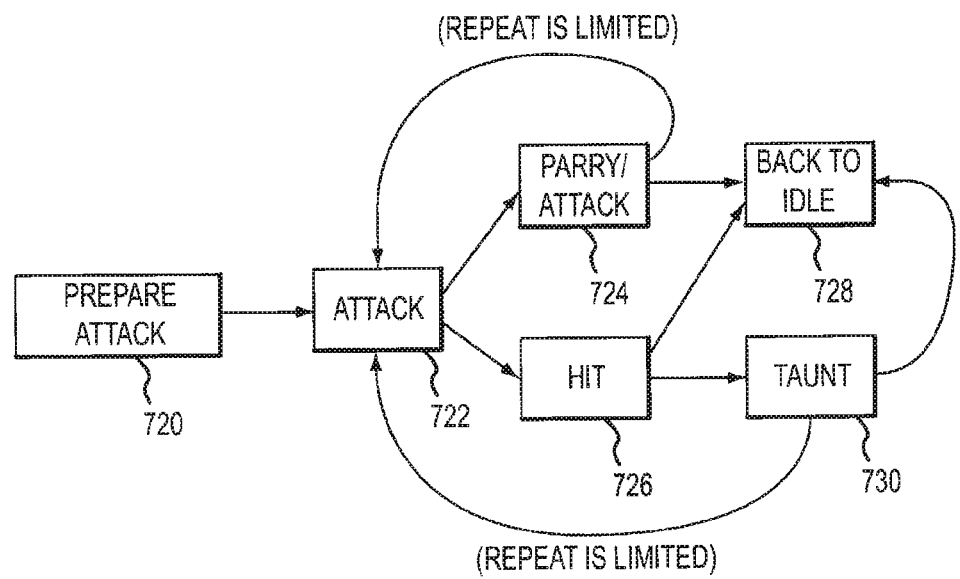

With reference to FIGS. 7(a) and 7(b), there are illustrated exemplary flowcharts illustrating how the interaction of the user-controlled character and the non-user-controlled character occurs.

Both flowcharts have four distinct sections or phases before a repeat occurs, corresponding to the four possible quadrants a user may move into in the preferred embodiment. This allows for sets of animations to be created that fit into these four phases.

Referring to FIG. 7(a), there is illustrated the flow of interaction for a user-controlled character between the possible states of the user-controlled character. The possible states are:
  a) Prepare attack/parry
  b) Parry
  c) Attack
  d) Hit
  e) Turn Attack
  f) Back to Idle In an initial state 702 the user-controlled character is in a state to either prepare for an attack or to parry an attack. This effectively means that the user-controlled character and the non-user controlled character are positioned in accordance with the sequence illustrated with reference to FIG. 1, with the two characters (or more if multiple non-user-controlled characters are involved) poised to engage following the user controlling the user-controlled character to move into a quadrant in which the non-user controlled character is positioned.

Thereafter, in dependence on a user input, the user-controlled character will enter either into a state 704 in which an attempt is made to parry an attack, or the user-controlled character will enter into a state 706 in which an attempt is made to attack the non-user controlled character.

Following a parry of an attack in state 704, the user-controlled character can move to one of three states depending on a user input: a state 712 in which the character is idle, a state 708 in which an attack is prepared, or a state 710 in which an attack, e.g. a hit, takes place.

Following the attack state 708 the state of the user-controlled character returns to the idle state 712. Following a hit state 710 the state of the user-controlled character returns to idle state 712, or the user turns the attack in state 714. Following the turning of the attack, the user-controlled character moves to idle state 712.

Following the hit state 706 the user-controlled player either moves to the turn attack state 714, or returns to the idle state 712.

The described process flow allows the control system to swap out animation sets to mix-up the displayed interaction. Thus for a given state of a character, in a given quadrant, one of a sub-set of animations is displayed. In this way the user-controlled character may attack the non-user controlled character with a certain move, and then attack another non-user controlled character with a different move. Both attacks however follow the same sequence of states as illustrated in FIG. 7(a), but the animation displayed for the attacks is different as the animation is selected from a sub-set of animations associated with a particular attack in a particular quadrant and for particular user inputs.

All attacks conform, however, to the four-stage rule, i.e., the rule that the area around the user-controlled character is divided, in the preferred embodiment, into four regions.

Referring to FIG. 7(b), there is illustrated the flow of interaction for a non-user-controlled character between the possible states of the non-user-controlled character. The possible states are:
  a) Prepare attack (step 720)
  b) Attack (step 722)
  c) Hit (step 726)
  d) Parry/Attack (step 724)
  e) Taunt (step 730)
  f) Back to Idle (step 728)

An additional feature of the interaction between the user-controlled characters and the non-user controlled characters is that it allows for both the non-user controlled characters and the user controlled character being on a different height level than the character they are interacting with. This height difference may be the result, for example, of a flight of stairs or the inclusion of an object such as a table in the environment in which the interaction occurs.

The basic system implementing the game rules and the game play remains the same, while the moves of the characters adjust accordingly. If, for an example, a non-user-controlled character in a particular quadrant is on a table, then the system recognizes this and trims down the animation sets for that quadrant that can be used accordingly. The character on the table will only be able to use low attacks and low defenses, and the character on the floor will only be able to use high attacks and high defenses. This gives the impression of multiple level fighting, and offers a new dimension to the interaction.

A user-controlled character beats an enemy by landing blows on them, during an attack, with their sword (in the example of a swordfight). In order to do this the user needs to catch the enemy off guard or by breaking their guard down. This can be done with any of the available attacks, in accordance with the game design, but may also be dependent upon the type of enemy. For example, a 'cannon fodder' type enemy may be able to parry two light attacks, five seconds of swordplay, or one heavy attack before their guard is broken. When their guard is down a further attack from the player may land a blow, which either damages or destroys them.

User-controlled character attacks may also be countered depending on the enemy character. For example, swordplay with certain tougher enemy characters may result in the user-controlled characters guard being broken, rather than the enemies. In such case a different tactic may be needed to break the enemy, and the user will need to experiment.

'Breaking' an enemy may only last a short time. Once an enemy is broken the user-controlled character may only have a few seconds to perform a follow-up attack before the enemy recovers and joins a further attack. The system of the present invention can mix this in group situations so the user-controlled character does not have time to land the final blow, instead having to switch their attention to their enemies or enemy units.

The system preferably also allows the user to build up a combination of attack moves and gain momentum in their swordplay as if they were wearing down an opponent.

The system preferably utilizes a manual engagement system where the user is free to move around as they wish. The only point at which engagement takes place is when the player holds down the appropriate attack buttons on the user interface. Engaging in an attack may slow the user-controlled characters movement slightly and lock them into the enemy they are fighting. The user can break out of an engagement at any time and still have full control and movement of the user-controlled character.

The animation that may be displayed and the animation options for display will depend upon the interactive animation environment. In a typical computer game involving combat or fighting, the animation options will depend upon whether a character has a weapon or not, whether the weapon is drawn or not, etc. One skilled in the art will fully understand that the animation will be required in accordance with game design, and the options for character interaction required by the game design.

The present invention, and embodiments thereof, achieves a number of advantages in the context of interactive animation for computer game applications.

A cinematic experience for a game user is created or improved.

In the context of a game including close contact combat, a realistic interaction between two or more characters is created. In particular, accurate detection of close combat weaponry is provided. In the context of a swordfight, a realistic on-screen swordfight is provided. In general, a realistic representation is provided for any close contact interaction.

A user is provided with control over the interactive animation, such as control over a close contact fight.

A user is able to engage more than one other character, such as enemies, by the definition of active regions.

A user may fight and engage on multiple levels and angles.

Automation of a defined animation set is provided to manage complexity of user control.

Various additional modifications and variations to the invention and its described embodiments will be apparent to one skilled in the art. All deviations from the specific teachings of this specification that rely upon the principles and their equivalents through which the art has been advanced are within the scope of the invention as described and claimed. For example, the above description stresses the usefulness of the interactive animation method in providing enhanced graphics in the case of a video game involving fighting such as a game environment having swordplay or the like. The animation techniques are readily applicable to many other video game settings in which a player moves a user-controlled character through a virtual game world, interacts with game controlled characters or objects including responding to the interaction by selecting particular behaviors or actions for their user-controlled characters, and views the actions of the game controlled characters as they respond to these behaviors or actions.

Further, as discussed above, the interactive animation method described herein may be used to provide an enhanced video game. Hence, an embodiment of the invention may include a video game device capable of executing a video game program that incorporates the interactive animation discussed above. While such a video game program of the present invention can be executed under any computer system capable of communicating with other devices, the following description is directed to a video game program being executed by a video game device (e.g., a particular example of an information processing device or computing device) which may be standalone device for one or more users or a device capable of communicating with other devices. The invention is not limited to use to a particular video game device, but it may be implemented with nearly any video game device capable of executing a video game program according to the present invention such as a portable video game device, a video game device adapted for use with a television or other monitor, a computer such as a desktop, laptop, notebook, or other computer, a telephone such as a cellular phone, or any other electronic device adapted for running a video game program including the animation methods of the invention.

For example, a video game device of the invention may include one or more monitors on which animation may be displayed such as one or more LCDs (Liquid Crystal Display) and such a display or monitor may be provided within the game housing or as a separate monitor (such as a television). While LCDs are one preferred embodiment, the monitor or display device may be of any other suitable type, e.g., an EL (Electro Luminescence) display device. Moreover, the resolution of the monitor or display device is not limited to the particular resolution used herein. One or more speakers allowing game sounds to pass through may also be provided as part of the video game device or external speakers may be used such as provided in a television or attached to the game device. The video game device include user input or interface devices such as a set of input devices that may include typical video game input devices such as a cross-shaped switch, a start switch, a select switch, an A button, a B button, an X button, a Y button, a power switch, a left or L button, a right or R button, and the like such as a touch screen or peripherals such as a joystick. Another input device is a touch panel or screen attached on the screen of an LCD. The housing in many embodiments includes slots for accommodating a memory card (e.g., a game cartridge). The memory card or game cartridge is a storage medium storing the video game program run by the video game device and, typically, for storing the animations described herein. In other embodiments, though, the video game program(s) and animations may be accessed via a communications network such as the Internet.

In implementations in which the video game device is a portable device or is a device that is linked to a television or other monitor/speaker system, the internal configuration of the video game device may include a CPU mounted on an electronic circuit board positioned in the game housing. The CPU may be connected to an input/output interface circuit, one or more GPU (Graphics Processing Unit) and a monitor controller such as via a bus. A connector or memory interface may be provided for receiving the memory card, which may include ROM storing the video game program including the animations and RAM such as for rewritably storing backup data. The video game program stored in the ROM of the memory card is typically loaded to the RAM, and the loaded video game program is executed by the CPU during operation of the video game device. In addition to the video game program, the RAM also stores temporary data produced while the CPU is running a program. The input/output circuit may be connected to the user inputs or control switch section (e.g., user interface) and monitor. Video RAM or VRAM may be used to provide storage of animations or images rendered according to the invention and may be stored in RAM prior to display by the GPU or other graphics controllers (e.g., see FIG. 5 for description of one useful video game device for implementing or running the animation processes of the present invention).

As will be clear to those skilled in the arts, numerous embodiments of game apparatus and game controllers may be used to practice the present invention, e.g., to run the interactive animation methods described herein as part of a video game program stored on storage medium such as memory card, game cartridge, or the like, and the above description of a video game device is not intended to limit the breadth of coverage. For example, the video game program may be stored on a disk (e.g., a CD or other data storage media) and downloaded into a computer's memory to be run or run from disk. Alternatively, the game program and its animations may be accessed by using an electronic device to access a Web site or to access (in a wired or wireless manner) memory over a digital communications network such as the Internet and the video game may be run remotely or after storage on local memory.

The invention claimed is:

1. A video game system for controlling an interactive animation environment including at least one user-controlled object, the system comprising:
a video game device monitor for displaying animation corresponding to the interactive animation environment;
data storage storing a set of pre-rendered animations of the user-controlled object; and
a controller in communication with the data storage operating to: determine a position of the user-controlled object; define a plurality of regions about said position;
detect a user input via a user input device to move the position of the user-controlled object; associate the detected user input to move the position of the user-controlled object with a region in the direction of movement that includes an active element with which the user-controlled object may interact; select a subset of the stored animations from the storage device for the user-controlled object; and provide an animation of the user-controlled object using the selected subset of the stored animations for display on the video game device monitor,
wherein the providing the animation comprises providing an animation of the user-controlled object and the active element,
wherein the selected subset of the stored animations are chosen by the controller based on a state of the user-controlled object and a state of the active element, and
wherein the controller further operates to queue, for use in the providing of the animation additional subsets of the pre-rendered animations of the user-controlled object and a subset of the pre-rendered animations of the active element in the data storage associated with choreographed states of the user-controlled object and of the active element that sequentially follow the states used by the controller to choose the selected subset of the stored animations.

2. The video game system of claim 1, wherein the position of the active element is adjusted prior to the providing of the animation of the user-controlled object and the active element to match the position of the user-controlled object and active element for the step of providing the animation.

3. The video game system of claim 1, wherein the providing of an animation includes receiving user input for controlling the user-controlled object and wherein the selecting of the subset of the stored animations is performed by the controller in response to the received user input.

4. The video game system of claim 3, wherein the received user input relates to a movement of the user-controlled object relative to the region.

5. The video game system of claim 1, wherein the active element is a non-user-controlled object controlled by an artificial intelligence agent.

6. The video game system of claim 1, wherein the providing an animation by the controller includes receiving information identifying a behavior of the active element.

7. The video game system of claim 1, wherein the providing an animation by the controller includes providing an animation of interaction of the user-controlled object with the active element, the animation of interaction including a set of stored animations for the active element selected in response to a user input for controlling the user-controlled object.

8. A method for providing a choreographed interactive animation environment including a user-controlled object, comprising:
in a storage device, storing a first set of animations associated with a first state of the user-controlled object;
in a storage device, storing a second set of animations associated with a second state of the user-controlled object;
after the storing, operating a controller to detect a user input via a user input device selecting one of the first and second states;
with the controller, retrieving one of the first and second sets of animations corresponding to the selected one of the first and second states;
with the controller, providing an animation of the user-controlled object using the retrieved one of the sets of animations for display on a monitor of a video game device; and
after the operating of the controller to detect selection of one of the first and second states:
in a storage device, storing third and fourth sets of animations associated with third and fourth states, respectively, of the user-controlled object;
operating the controller to detect a user input via the user input device selecting one of the third and fourth states;
with the controller, retrieving one of the third and fourth sets of animations corresponding to the selected one of the third and fourth states; and
with the controller, providing an animation of the user-controlled object using the retrieved one of third and fourth sets of animations for display on the monitor,
wherein the third and fourth sets of animation are selected for storage by the controller based on whether the first state or the second state is selected with the user input and a predefined sequence of selectable states for the user-controlled object and
wherein the selectable states are chosen from the group consisting of prepare attach/parry, parry, attack, hit, turn attack, and back to idle.

9. The method of claim 8, wherein the interactive animation environment includes an active element and wherein the method further includes:
in a storage device, storing a first set of animations associated with a first state of he active element;
in a storage device, storing a second set of animations associated with a second state of the active element; and based on the selected one of the first and second states of the user-controlled object, operating the controller to select and retrieve one of the first and second sets of animations, wherein the providing of the animation includes providing a combined animation of the user-controlled object and the active element using the retrieved sets of animations.

10. The method of claim 8, wherein the first and second sets of animations are selected for storage by the controller after determining a present state of the user-controlled object.

11. The method of claim 8, wherein the first and second sets of animations are selected by the controller based on a predefined sequence of selectable states for the user-controlled object, the predefined sequence further defining additional states, each having an associated set of animations stored in memory accessible by the controller, for the user-controlled object that are selectable after selection of the first and second states.

12. A method for providing a choreographed interactive animation environment including a user-controlled object, comprising:

in a storage device, storing a first set of animations associated with a first state of the user-controlled object;

in a storage device, storing a second set of animations associated with a second state of the user-controlled object;

after the storing, operating a controller to detect a user input via a user input device selecting one of the first and second states;

with the controller, retrieving one of the first and second sets of animations corresponding to the selected one of the first and second states;

with the controller, providing an animation of the user-controlled object using the retrieved one of the sets of animations for display on a monitor of a video game device; and after the operating of the controller to detect selection of one of the first and second states:

in a storage device, storing third and fourth sets of animations associated with third and fourth states, respectively, of the user-controlled object;

operating the controller to detect a user input via the user input device selecting one of the third and fourth states;

with the controller, retrieving one of the third and fourth sets of animations corresponding to the selected one of the third and fourth states; and with the controller, providing an animation of the user-controlled object using the retrieved one of third and fourth sets of animations for display on the monitor, wherein the first and second sets of animations are selected for storage by the controller after determining a present state of the user-controlled object.

13. The method of claim 12, wherein the third and fourth sets of animation are selected for storage by the controller based on whether the first state or the second state is selected with the user input and a predefined sequence of selectable states for the user-controlled object.

14. The method of claim 13, wherein the selectable states are chosen from the group consisting of prepare attach/parry, parry, attack, hit, turn attack, and back to idle.

15. The method of claim 12, wherein the interactive animation environment includes an active element and wherein the method further includes:

in a storage device, storing a first set of animations associated with a first state of the active element;

in a storage device, storing a second set of animations associated with a second state of the active element; and based on the selected one of the first and second states of the user-controlled object, operating the controller to select and retrieve one of the first and second sets of animations, wherein the providing of the animation includes providing a combined animation of the user-controlled object and the active element using the retrieved sets of animations.

16. The method of claim 12, wherein the first and second sets of animations are selected by the controller based on a predefined sequence of selectable states for the user-controlled object, the predefined sequence further defining additional states, each having an associated set of animations stored in memory accessible by the controller, for the user-controlled object that are selectable after selection of the first and second states.

17. A method for providing a choreographed interactive animation environment including a user-controlled object, comprising:

in a storage device, storing a first set of animations associated with a first state of the user-controlled object;

in a storage device, storing a second set of animations associated with a second state of the user-controlled object;

after the storing, operating a controller to detect a user input via a user input device selecting one of the first and second states;

with the controller, retrieving one of the first and second sets of animations corresponding to the selected one of the first and second states;

with the controller, providing an animation of the user-controlled object using the retrieved one of the sets of animations for display on a monitor of a video game device; and after the operating of the controller to detect selection of one of the first and second states:

in a storage device, storing third and fourth sets of animations associated with third and fourth states, respectively, of the user-controlled object;

operating the controller to detect a user input via the user input device selecting one of the third and fourth states;

with the controller, retrieving one of the third and fourth sets of animations corresponding to the selected one of the third and fourth states; and with the controller, providing an animation of the user-controlled object using the retrieved one of third and fourth sets of animations for display on the monitor, wherein the first and second sets of animations are selected by the controller based on a predefined sequence of selectable states for the user-controlled object, the predefined sequence further defining additional states, each having an associated set of animations stored in memory accessible by the controller, for the user-controlled object that are selectable after selection of the first and second states.

18. The method of claim 17, wherein the third and fourth sets of animation are selected for storage by the controller based on whether the first state or the second state is selected with the user input and a predefined sequence of selectable states for the user-controlled object.

19. The method of claim 18, wherein the selectable states are chosen from the group consisting of prepare attach/parry, parry, attack, hit, turn attack, and back to idle.

20. The method of claim 17, wherein the interactive animation environment includes an active element and wherein the method further includes:
- in a storage device, storing a first set of animations associated with a first state of the active element;
- in a storage device, storing a second set of animations associated with a second state of the active element; and
- based on the selected one of the first and second states of the user-controlled object, operating the controller to select and retrieve one of the first and second sets of animations, wherein the providing of the animation includes providing a combined animation of the user-controlled object and the active element using the retrieved sets of animations.

\* \* \* \* \*

UNITED STATES PATENT AND TRADEMARK OFFICE
CERTIFICATE OF CORRECTION

| | |
|---|---|
| PATENT NO. | : 7,952,585 B2 |
| APPLICATION NO. | : 12/916825 |
| DATED | : May 31, 2011 |
| INVENTOR(S) | : Bridger et al. |

Page 1 of 1

It is certified that error appears in the above-identified patent and that said Letters Patent is hereby corrected as shown below:

Column 17, line 55, after "animation", insert --,--.

Column 18, line 65, delete "he" and insert therefor --the--.

Signed and Sealed this
Nineteenth Day of July, 2011

David J. Kappos
*Director of the United States Patent and Trademark Office*